United States Patent [19]
Morvan

[11] Patent Number: 5,657,841
[45] Date of Patent: Aug. 19, 1997

[54] EXTENSION CORD REEL ASSEMBLY WITH GROUND FAULT INTERRUPT OUTLETS

[76] Inventor: Jacques Morvan, 2602 Hollington Crescent, Mississauga, Ontario, Canada, L5K 1E7

[21] Appl. No.: 608,008

[22] Filed: Mar. 4, 1996

[51] Int. Cl.[6] ............................................. H02G 11/02
[52] U.S. Cl. ............................ 191/12.4; 439/501
[58] Field of Search ........................... 439/4, 107, 488, 439/490, 501, 650; 191/12.2 R, 12.4

[56] References Cited

U.S. PATENT DOCUMENTS

| | | | |
|---|---|---|---|
| 2,247,868 | 7/1941 | Beasley | 191/12.2 R |
| 3,369,084 | 2/1968 | Cook | 191/12.4 |
| 4,282,954 | 8/1981 | Hill | 191/12.4 |
| 4,338,497 | 7/1982 | Drew | 191/12.4 |
| 4,520,239 | 5/1985 | Schwartz | 191/12.4 |
| 4,656,320 | 4/1987 | Maddock | 191/12.4 |
| 4,685,634 | 8/1987 | Schwartz | 191/12.4 X |
| 4,725,697 | 2/1988 | Kovacik et al. | 191/12.4 |
| 5,146,385 | 9/1992 | Misencik | 439/490 X |

Primary Examiner—David A. Bucci
Assistant Examiner—Scott L. Lowe

[57] ABSTRACT

An extension cord reel assembly with ground fault interrupt outlets comprising: a main housing unit including a front wall and a rear wall and an upper region including at least one carry handle affixed thereto, the front wall including a large circular aperture and the rear wall including a small circular aperture; a hub including planar first and second end members and a cylindrical central section, the hub being positioned within the outer housing, the first end member including a recess and a rewind handle, an electrical cord and plug extending from the interior of the hub and through the outer housing; at least one outlet box being positioned within a recess of the first end member and operatively coupled to the electrical cord, each outlet box including duplex female ground electrical sockets, a ground fault interrupt device, and a power indicator light, a front cover plate being coupled to the first end member of the hub, a rear cover plate being coupled to the second end member, the hub being rotatable within the outer housing by rotating the rewind handle thereby rolling up the cord.

1 Claim, 4 Drawing Sheets

5,657,841

EXTENSION CORD REEL ASSEMBLY WITH GROUND FAULT INTERRUPT OUTLETS

BACKGROUND OF THE INVENTION

1. Field of the Invention

The present invention relates to an extension cord reel assembly with ground fault interrupt outlets and more particularly pertains to providing users with an easily transportable extension cord device with multiple electrical sockets and safety shut-off means.

2. Description of the Prior Art

The use of extension cord reels is known in the prior art. More specifically, extension cord reels heretofore devised and utilized for the purpose of storing and transporting extension cords are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,656,320 to Maddock a cord reel.

U.S. Pat. No. 4,520,239 to Schwartz discloses an electrical cord reel and storage system.

U.S. Pat. No. 4,338,497 to Drew discloses an extension cord reel set.

U.S. Pat. No. 4,244,536 to Harrill discloses an extension cord reel.

Lastly, U.S. Pat. No. 5,229,730 to Legatti discloses a resetable circuit interrupter.

In this respect, the extension cord reel assembly with ground fault interrupt outlets according to the present invention substantially departs from the conventional concepts and designs of the prior art, and in doing so provides an apparatus primarily developed for the purpose of providing users with an easily transportable extension cord device with multiple electrical sockets and safety shut-off means.

Therefore, it can be appreciated that there exists a continuing need for a new and improved extension cord reel assembly with ground fault interrupt outlets which can be used for providing users with an easily transportable extension cord device with multiple electrical sockets and safety shut-off means. In this regard, the present invention substantially fulfills this need.

SUMMARY OF THE INVENTION

In view of the foregoing disadvantages inherent in the known types of extension cord reels now present in the prior art, the present invention provides an improved extension cord reel assembly with ground fault interrupt outlets. As such, the general purpose of the present invention, which will be described subsequently in greater detail, is to provide a new and improved extension cord reel assembly with ground fault interrupt outlets and method which has all the advantages of the prior art and none of the disadvantages.

To attain this, the present invention essentially comprises a new and improved extension cord reel assembly with ground fault interrupt outlets comprising, in combination: a main housing unit formed in a generally semi-circular configuration with a front wall, a rear wall, opposing sidewalls, a floor and an essentially hollow interior, the main housing unit having a rounded upper region and a rectangular lower region, a carry handle being affixed to the rounded upper region adjacent to each sidewall, a first sidewall including a cord hole extending therethrough adjacent to the floor, the front wall including a circular aperture with a diameter measuring about ninety percent of the width of the front wall, the rear wall including a central aperture with a diameter measuring about fifty percent of the width of the rear wall; a hub including planar circular first and second end members, a large cylindrical central section coupling the end members together, in an operative orientation the hub being positioned within the outer housing, the first end member including a cylindrical rewind handle extending therefrom, the central section having an essentially hollow interior, the central section including a cord hole extending therethrough, a one hundred foot electrical cord having a first end positioned within the hub, the cord having an intermediate section positioned through the cord hole in the central section and cord hole in the first sidewall of the outer housing, the cord having a second end positioned outside of the outer housing and including a male ground electrical plug, the diameter of each end member being smaller than the height and width of the outer housing, the width of the hub being smaller than the width of the outer housing, the second end member of the hub including a plurality of apertures adjacent to the central section, the first end member including two large apertures extending therethrough and within the central section, a plurality of screw holes being positioned around the apertures; two outlet boxes each formed in a generally rectangular configuration and operatively coupled to the first end of the electrical cord, the outlet boxes being coupled within the recesses of the first end member of the hub by a plurality of screws, each outlet box including duplex female ground electrical sockets, a reset button and a test button, each box including ground fault interrupt means operatively coupled to the electrical sockets, reset button and test button, the ground fault interrupt means terminating the flow of electrical current through the apparatus when exposed to undesired situations such as ground fault current and power surges, the reset buttons being depressed by a user to reset the apparatus when the undesired situation has been eliminated, the test buttons being depressed to determine that the sockets to be utilized are operational, the outlet box further including a power indicator light positioned adjacent to each female socket and operatively coupled thereto, the light illuminating when electrical current flows through the adjacent socket; and front and rear cover plates each formed in a planar circular configuration, the front plate including two rectangular apertures and a plurality of screw holes, the rear plate including a plurality of screw holes, the front cover plate being rotatably positioned within the front wall of the outer housing and coupled to the first end member with a plurality of screws, the female ground electrical sockets of each outlet box extending through a rectangular aperture of the front plate, the rear cover plate having an inner surface including a recessed peripheral groove, the rear cover plate being rotatably positioned within the rear wall of the outer housing and coupled to the second end member with a plurality of screws, the hub being rotatable within the outer housing by gyrating the rewind handle in a clockwise direction, this action causing the electrical cord to wind around the central section of the hub, a user pulling the second end of the cord to unroll the cord from the hub.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and. practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved extension cord reel assembly with ground fault interrupt outlets which has all of the advantages of the prior art extension cord reels and none of the disadvantages.

It is another object of the present invention to provide a new and improved extension cord reel assembly with ground fault interrupt outlets which may be easily and efficiently manufactured and marketed.

It is further object of the present invention to provide a new and improved extension cord reel assembly with ground fault interrupt outlets which is of durable and reliable constructions.

An even further object of the present invention is to provide a new and improved extension cord reel assembly with ground fault interrupt outlets which is susceptible of a low cost of manufacture with regard to both materials and labor, and which accordingly is then susceptible of low prices of sale to the consuming public, thereby making such extension cord reel assembly with ground fault interrupt outlets economically available to the buying public.

Still yet another object of the present invention is to provide a new and improved extension cord reel assembly with ground fault interrupt outlets which provides in the apparatuses and methods of the prior art some of the advantages thereof, while simultaneously overcoming some of the disadvantages normally associated therewith.

Still another object of the present invention is to provide users with an easily transportable extension cord device with multiple electrical sockets and safety shut-off means.

Lastly, it is an object of the present invention to provide an extension cord reel assembly with ground fault interrupt outlets comprising: a main housing unit including a front wall, a rear wall, and an essentially hollow interior, the main housing unit having an upper region including at least one carry handle affixed thereto, the front wall including a large circular aperture and the rear wall including a small circular aperture; a hub including planar first and second end members and a cylindrical central section, the hub being positioned within the outer housing, the first end member including at least one recess and a cylindrical rewind handle, the central section having an essentially hollow interior, an electrical cord and plug extending from the interior of the hub and through the outer housing; at least one outlet box being positioned within a recess of the first end member and operatively coupled to the electrical cord, each outlet box including duplex female ground electrical sockets, each box including a ground fault interrupt device operatively coupled to the electrical sockets and a power indicator light positioned adjacent to each female socket and operatively coupled thereto; and front and rear cover plates, the front plate being coupled to the first end member of the hub, the rear cover plate being coupled to the second end member, the hub being rotatable within the outer housing by rotating the rewind handle thereby rolling up the cord.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
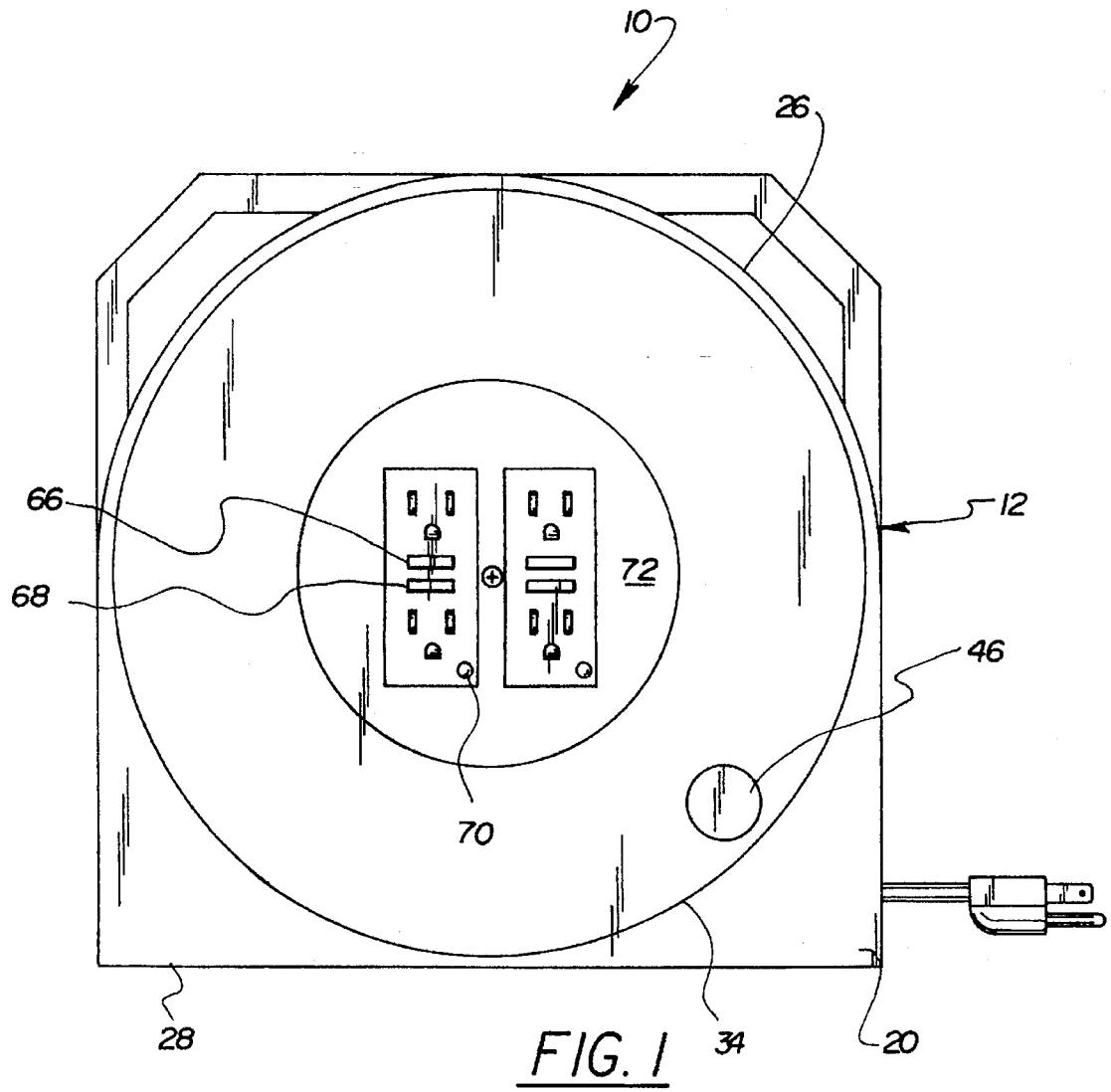
FIG. 1 is a perspective view of the preferred embodiment of the extension cord reel assembly with ground fault interrupt outlets constructed in accordance with the principles of the present invention.

With reference now to the drawings, and in particular to FIG. 1 thereof, the preferred embodiment of the new and improved extension cord reel assembly with ground fault interrupt outlets embodying the principles and concepts of the present invention and generally designated by the reference numeral 10 will be described.

The present invention, the extension cord reel assembly with ground fault interrupt outlets 10 is comprised of a plurality of components. Such components in their broadest context include a main housing unit 12, a hub 14, an electrical cord 16 and two outlet boxes 18. Such components are individually configured and correlated with respect to each other so as to attain the desired objective.

More specifically, the main housing unit 12 is formed in a generally semi-circular configuration with a front wall 20, a rear wall 22, opposing sidewalls, a floor 24 and an essentially hollow interior. The main housing unit is fabricated of plastic and has a rounded upper region 26 and a rectangular lower region 28. The outer housing is between three and four inches thick. The lower region has a flat bottom to provide a secure resting surface for the apparatus. Note FIG. 1.

Figure 2:
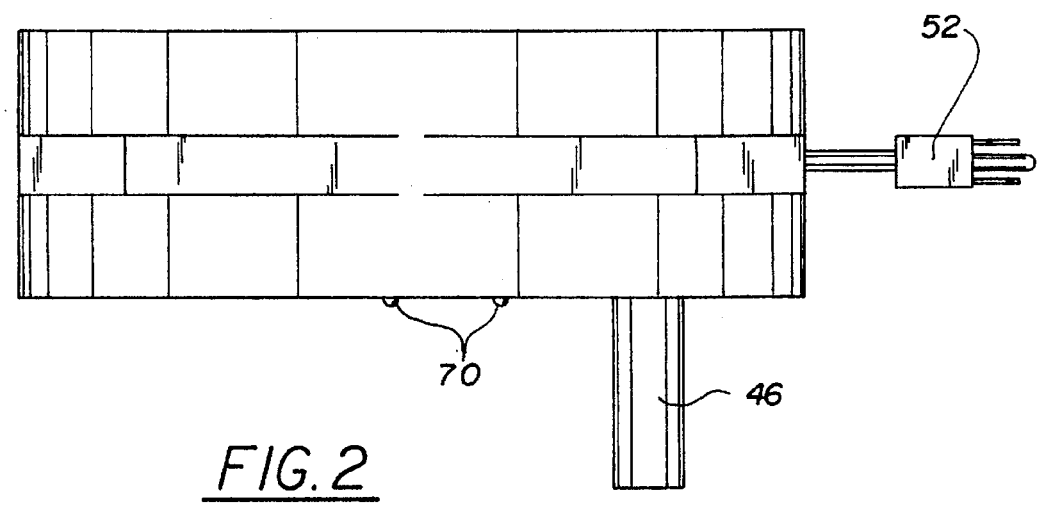
FIG. 2 is a top plan view of the apparatus shown in FIG. 1.
Figure 3:
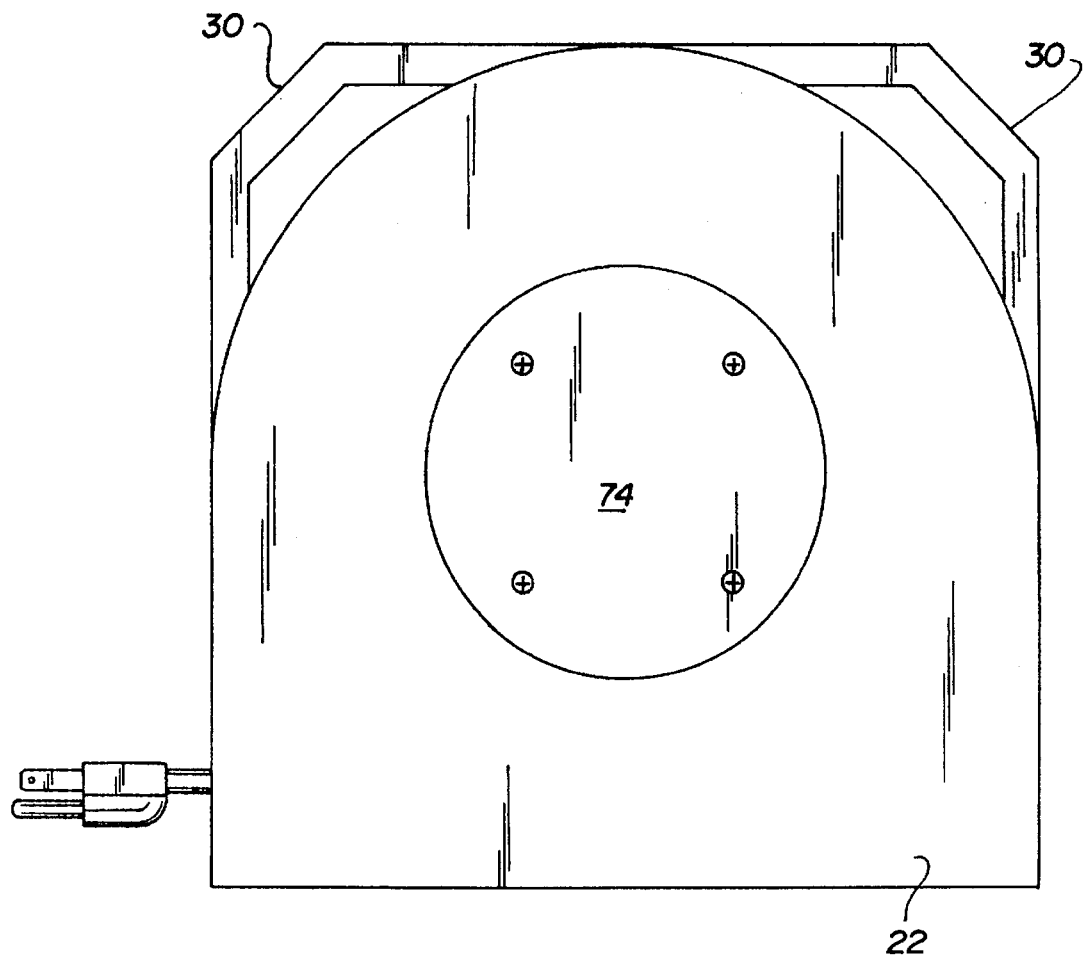
FIG. 3 is a rear plan view of the apparatus shown in FIG. 1.
Figure 4:
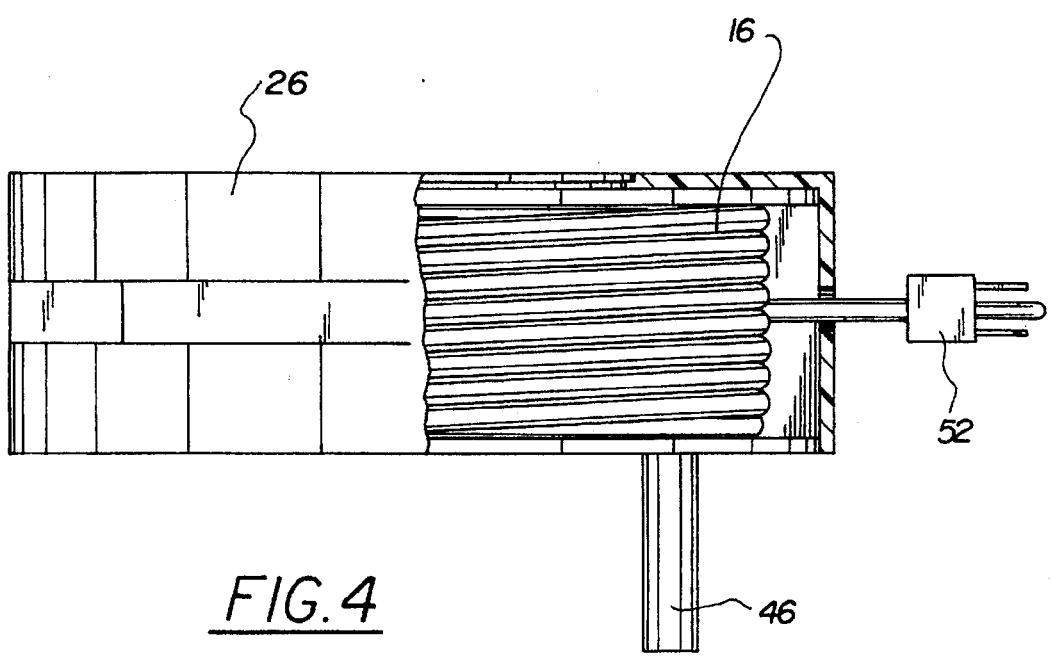
FIG. 4 is a partially broken away top plan view of the apparatus illustrating the electrical wire in a rolled orientation.
Figure 5:
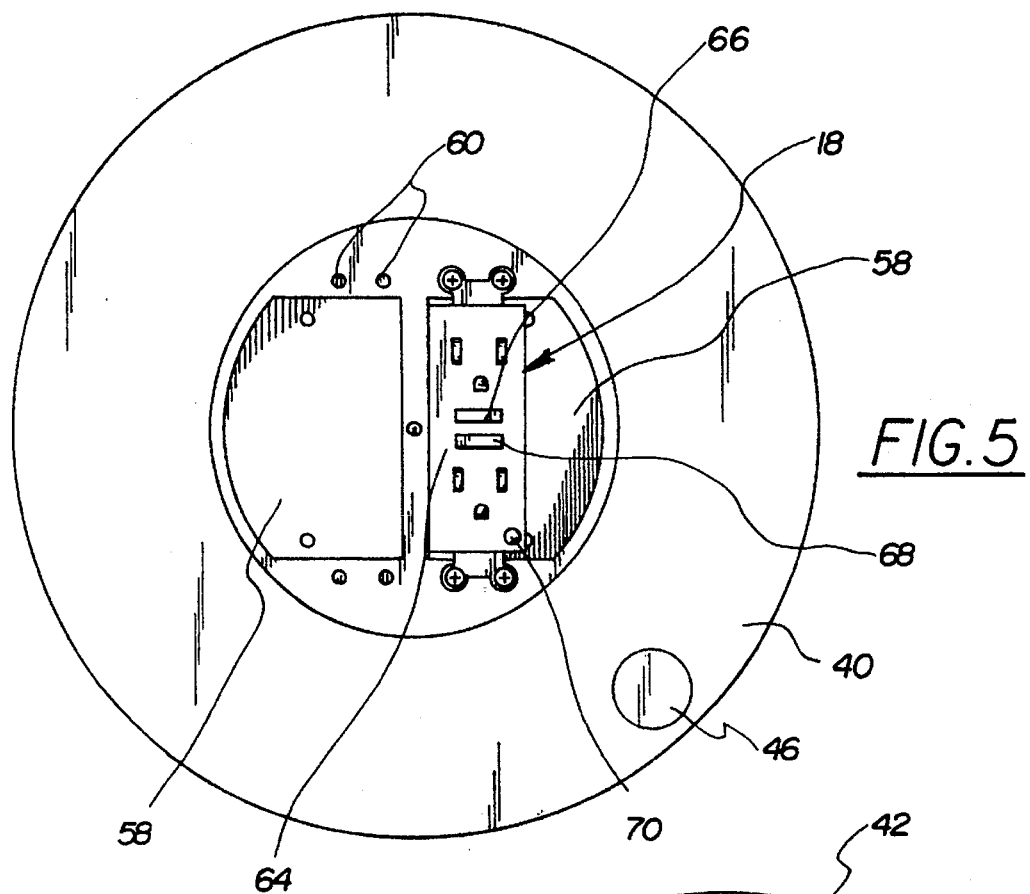
FIG. 5 is a front perspective view of the hub of the apparatus.
Figure 6:
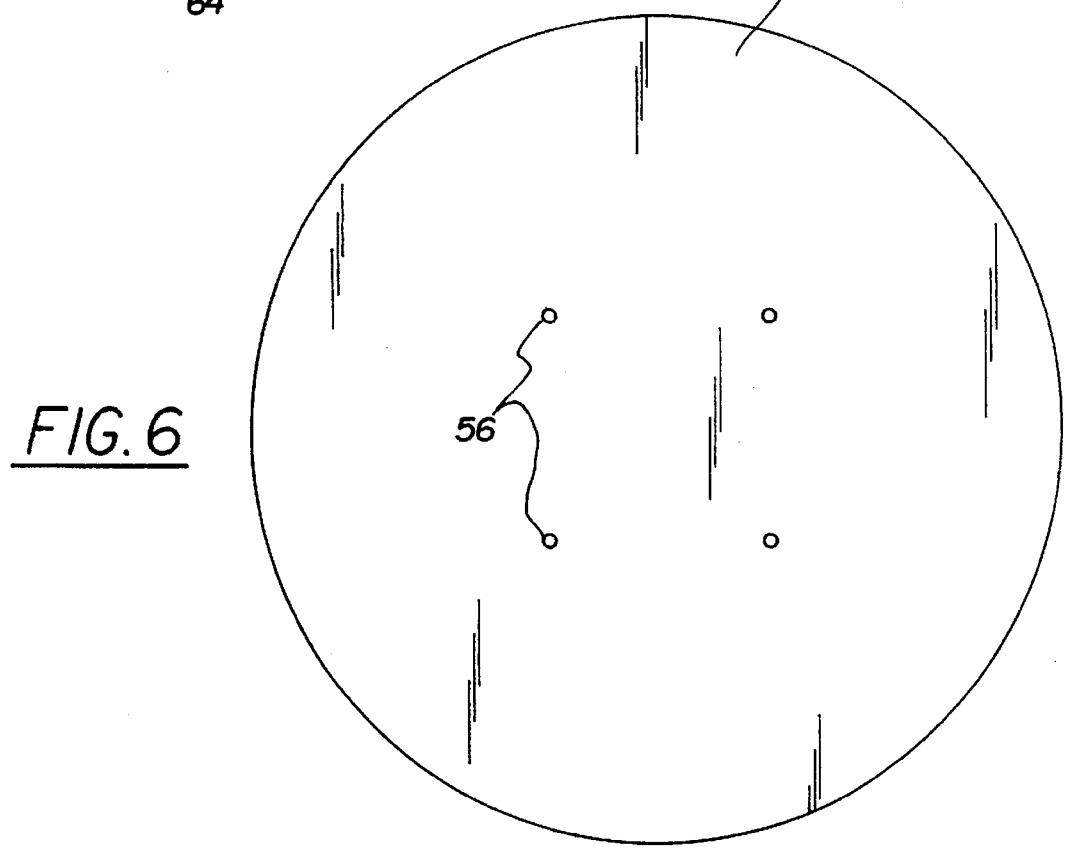
FIG. 6 is a rear perspective view of the hub of the apparatus.

A carry handle 30 is affixed to the rounded upper region adjacent to each sidewall. The carry handle permits users to easily transport the apparatus. A first sidewall of the outer housing includes a cord hole 32 extending through it adjacent to the floor. The front wall includes a circular aperture 34 with a diameter measuring about ninety percent of the width of the front wall. The rear wall includes a central aperture 36 with a diameter measuring about fifty percent of the width of the rear wall. The circular aperture of the front wall permits users to easily position the hub within the outer housing when assembly of the apparatus is desired. Note FIGS. 1–3.

The hub 14 includes planar circular first 40 and second 42 end members. A large cylindrical central section 44 couples the end members together. In an operative orientation the hub is rotatably positioned within the outer housing. The first end member includes a cylindrical rewind handle 46 extending perpendicularly from it. In alternate embodiments of the apparatus both the first and second end members include rewind handles to permit easy rewinding of the cord by both right and left handed individuals. The rewind handle is ergonomically designed to comfortably fit in a user's hand. In an operative orientation the user gyrates the handle in a clockwise direction to roll up the electrical cord. Note FIGS. 2 and 4–6.

The central section of the hub has an essentially hollow interior. The central section includes a cord hole 50 extending through it. The cord hole includes friction reducing washers positioned within it. A one hundred foot electrical cord 16 has a first end positioned within the hub and operatively coupled to the electrical boxes. The cord is fabricated of 14 gauge electrical wire. The cord has an intermediate section which extends through the cord hole in the central section and cord hole in the first sidewall of the outer housing. The cord has a second end positioned outside of the outer housing and including a male ground electrical plug 52. In an operative orientation a user simply positions the outer housing in the desired location and pulls the second end of the cord thereby unrolling the cord from the hub. The user then inserts the male ground electrical plug into a conventional outlet. Note FIGS. 1 and 4.

The diameter of each end member is smaller than the height and width of the outer housing. The width of the hub is smaller than the width of the outer housing. The size of the hub permits it to rotate within the outer housing. The second end member of the hub includes a plurality of screw holes 56 adjacent to the central section. The first end member includes two large apertures 58 extending through it and within the central section. A plurality of screw holes 60 are positioned around the apertures. Note FIG. 5.

Figure 7:
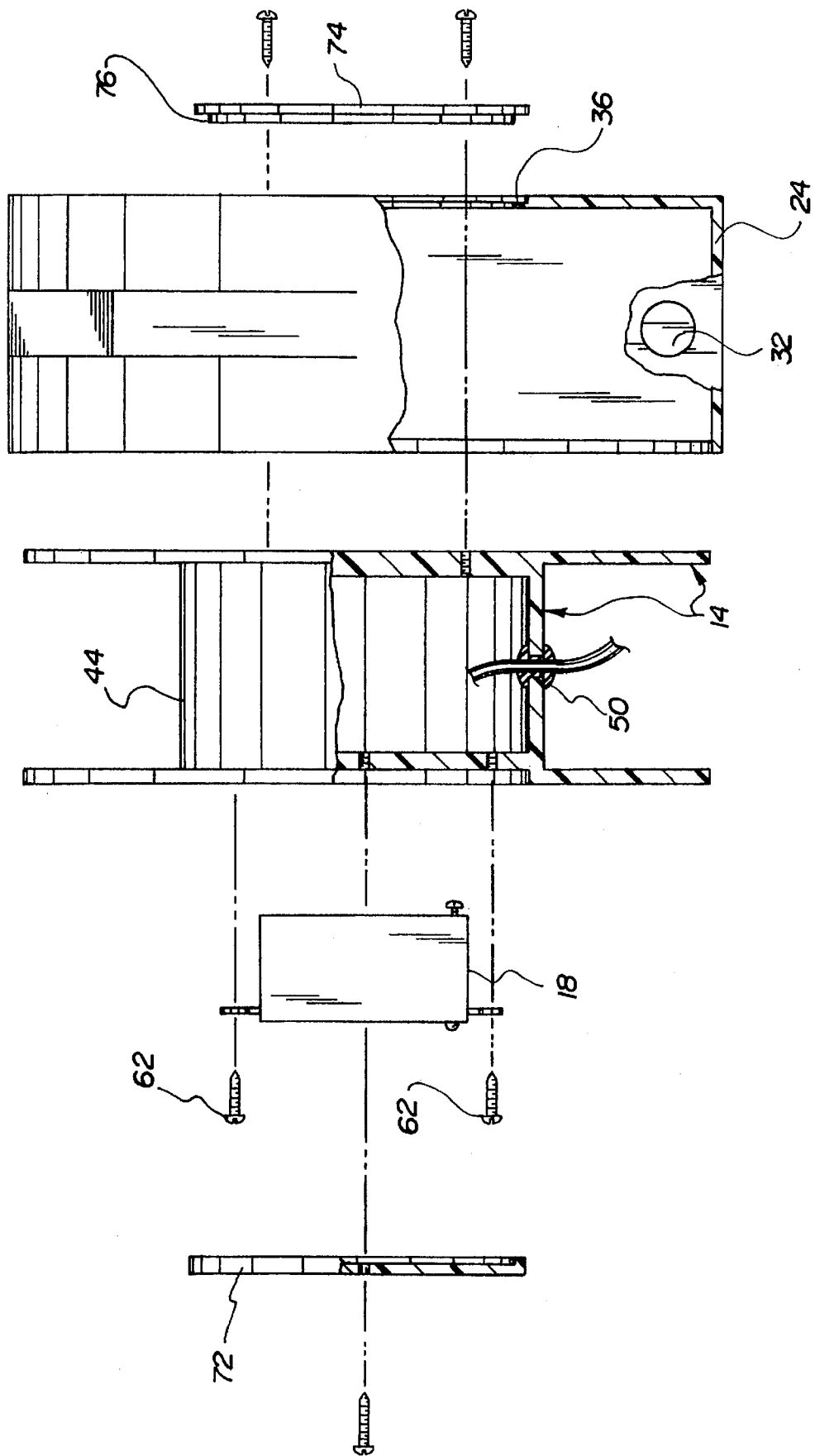
FIG. 7 is a separated perspective view illustrating the various components of the apparatus.

Two outlet boxes 18 are each formed in a generally rectangular configuration and operatively coupled to the first end of the electrical cord. The outlet boxes are coupled within the recesses of the first end member of the hub by a plurality of screws 62. Each outlet box includes duplex female ground electrical sockets 64. In alternate embodiments the apparatus includes triplex or quadraplex sockets. Each outlet box also includes a reset button 66 and a test button 68. Each outlet box further includes ground fault interrupt means which are operatively coupled to the electrical sockets, reset button and test button. Note FIGS. 1, 5 and 7.

The ground fault interrupt means terminate the flow of electrical current through the apparatus when exposed to undesired situations such as ground fault current and power surges. The ground fault interrupt means are set at 15 Amps which is the minimum ampage for most residential homes. Other undesired situations include floods and fires. The reset buttons are depressed by a user to reset the apparatus when the undesired situation has been eliminated. The test buttons are depressed to determine that the sockets to be utilized are operational. The outlet box further includes a power indicator light 70 positioned adjacent to each female socket. The light is operatively coupled to the outlet box and illuminates when electrical current flows through the adjacent socket. Note FIGS. 1 and 5.

Front 72 and rear 74 cover plates are each formed in a planar circular configuration. The front plate includes two rectangular apertures and a plurality of screw holes. The rear plate includes a plurality of screw holes. The front cover plate is rotatably positioned within the front wall of the outer housing and coupled to the first end member with a plurality of screws. The female ground electrical sockets of each outlet box extend through a rectangular aperture of the front plate. The rear cover plate has an inner surface which includes a recessed. peripheral groove. The aperture in the rear wall of the outer housing also includes a recessed groove 76. The rear cover plate is rotatably positioned within the aperture of the rear wall of the outer housing and coupled to the second end member with a plurality of screws. The hub is rotatable within the outer housing by gyrating the rewind handle in a clockwise direction. This action causes the electrical cord to wind around the central section of the hub. A user pulls the second end of the cord to unroll the cord from the hub. Note FIGS. 1, 3 and 7.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved extension cord reel assembly with ground fault interrupt outlets comprising, in combination:

a main housing unit formed in a generally semi-circular configuration with a front wall, a rear wall, opposing sidewalls, a floor and an essentially hollow interior, the main housing unit a main housing unit formed in a generally semi-circular configuration with a front wall, a rear wall, opposing sidewalls, a floor and an essentially hollow interior, the main housing unit being fabricated of plastic and having a rounded upper region and a rectangular lower region, the housing unit having a thickness of about three and one-half inches, a carry handle being affixed to the rounded upper region adjacent to each sidewall, a first sidewall including a cord hole extending therethrough adjacent to the floor, the front wall including a circular aperture with a diameter measuring about ninety percent of the width of the front wall, the rear wall including a central aperture with a diameter measuring about fifty percent of the width of the rear wall;

a hub including planar circular first and second end members, a large cylindrical central section coupling the end members together, in an operative orientation the hub being positioned within the outer housing, the first end member including a cylindrical rewind handle extending therefrom, the central section having an essentially hollow interior, the central section including a cord hole extending therethrough, a one hundred foot electrical cord having a first end positioned within the hub, the cord being fabricated of fourteen gauge electrical wire, the cord having an intermediate section positioned through the cord hole in the central section and cord hole in the first sidewall of the outer housing, the cord having outer housing, the second end member of the hub including a plurality of screw holes adjacent to the central section, the first end member including two large apertures extending therethrough and within the central section, a plurality of screw holes being positioned around the apertures;

two outlet boxes each formed in a generally rectangular configuration and operatively coupled to the first end of the electrical cord, the outlet boxes being coupled within the recesses of the first end member of the hub by a plurality of screws, each outlet box including duplex female ground electrical sockets, a reset button and a test button, each box including ground fault interrupt means operatively coupled to the electrical sockets, reset button and test button, the ground fault interrupt means terminating the flow of electrical current through the apparatus when exposed to undesired situations such as ground fault current and power surges, the ground fault interrupt means being set at fifteen amps, the reset buttons being depressed by a user to reset the apparatus when the undesired situation has been eliminated, the test buttons being depressed to determine that the sockets to be utilized are operational, the outlet box further including a power indicator light positioned adjacent to each female socket and operatively coupled thereto, the light illuminating when electrical current flows through the adjacent socket; and front and rear cover plates each formed in a planar circular configuration, the front plate including two rectangular apertures and a plurality of screw holes, the rear plate including a plurality of screw holes, the front cover plate being rotatably positioned within the front wall of the outer housing and coupled to the first end member with a plurality of screws, the female ground electrical sockets of each outlet box extending through a rectangular aperture of the front plate, the rear cover plate having an inner surface including a recessed peripheral groove, the rear cover plate being rotatably positioned within the rear wall of the outer housing and coupled to the second end member with a plurality of screws, the hub being rotatable within the outer housing by gyrating the rewind handle in a clockwise direction, this action causing the electrical cord to wind around the central section of the hub, a user pulling the second end of the cord to unroll the cord from the hub.

* * * * *